United States Patent
Svedhem (10) Patent No.: US 6,309,026 B1
(45) Date of Patent: Oct. 30, 2001

(54) METHOD AND ARRANGEMENT FOR SOUND-SUPPRESSION IN WHEELS

(75) Inventor: Stefan Svedhem, Trollhättan (SE)

(73) Assignee: SAAB Automobile AB (SE)

( * ) Notice: Subject to any disclaimer, the term of this patent is extended or adjusted under 35 U.S.C. 154(b) by 0 days.

(21) Appl. No.: 09/367,329

(22) PCT Filed: Feb. 9, 1998

(86) PCT No.: PCT/SE98/00220

§ 371 Date: Sep. 3, 1999

§ 102(e) Date: Sep. 3, 1999

(87) PCT Pub. No.: WO98/35843

PCT Pub. Date: Aug. 20, 1998

(30) Foreign Application Priority Data

Feb. 12, 1997 (SE) ................................................. 9700487

(51) Int. Cl.[7] ........................... B60B 19/00; B60C 11/03; E04B 1/82; F16H 55/14
(52) U.S. Cl. .................. 301/6.91; 152/209.2; 152/339.1; 181/286; 74/443
(58) Field of Search ......................... 74/443; 152/339.1, 152/209.6, 153, 450, 209.2; 301/6.91 I; 295/7; 181/207, 284, 286

(56) References Cited

U.S. PATENT DOCUMENTS

| | | | | |
|---|---|---|---|---|
| 1,897,789 | * | 2/1933 | Brooke ................................. | 301/6.91 |
| 2,901,290 | * | 8/1959 | Loofbourrow ....................... | 181/207 |
| 3,270,794 | * | 9/1966 | Skidmore ........................... | 152/339.1 |
| 3,414,036 | * | 12/1968 | Skidmore ........................... | 152/339.1 |
| 3,866,977 | * | 2/1975 | Rice ..................................... | 181/286 |
| 4,896,921 | * | 1/1990 | Sato et al. ............................ | 152/418 |
| 5,092,192 | * | 3/1992 | Pelzer ................................... | 301/6.91 |
| 5,598,479 | | 1/1997 | Dodt et al. ............................. | 381/71 |
| 5,899,253 | * | 5/1999 | Marron et al. ...................... | 301/6.91 |
| 5,959,265 | * | 9/1999 | Van Ligten .......................... | 181/286 |
| 6,009,705 | * | 1/2000 | Arnott et al. ........................ | 181/207 |
| 6,074,015 | * | 6/2000 | Renard et al. ...................... | 301/6.91 |
| 6,106,075 | * | 8/2000 | Suenaga .............................. | 301/6.91 |
| 6,167,985 | * | 1/2001 | Van Ligten .......................... | 181/286 |

FOREIGN PATENT DOCUMENTS

| | | |
|---|---|---|
| 0041127 | 12/1981 | (EP) . |
| 0663306 | 7/1995 | (EP) . |
| 0665529 | 8/1995 | (EP) . |

OTHER PUBLICATIONS

Patent Abstracts of Japan 07052616 dated Feb. 28, 1995.
Patent Abstracts of Japan 4–87801 dated Mar. 19, 1992.
Patent Abstracts of Japan 4–87802 dated Mar. 19, 1992.
Patent Abstracts of Japan 4–87803 dated Mar. 19, 1992.

* cited by examiner

Primary Examiner—S. Joseph Morano
Assistant Examiner—Jason R. Bellinger
(74) Attorney, Agent, or Firm—Ostrolenk, Faber, Gerb & Soffen, LLP

(57) ABSTRACT

A method and a device for sound suppression, in wheels, of natural frequency sound originating from an air cavity which is inside the wheel between the tire and the rim, which includes at least one resonator arranged inside the wheel. The resonator is designed for the suppression of sound resulting from the natural frequency of the wheel and is preferably formed of four quarter-wave resonators or of Helmholtz-resonators.

23 Claims, 7 Drawing Sheets

METHOD AND ARRANGEMENT FOR SOUND-SUPPRESSION IN WHEELS

BACKGROUND OF THE INVENTION

The present invention relates to a method and an arrangement for sound-suppression in wheels in accordance.

A person who is in the passenger compartment in a motor vehicle often experiences that he/she is in a noisy environment. The noise level, however, varies depending on the size and manufacture of the vehicle one is sitting in. It is also obvious that noise increases when the vehicle accelerates. A common inference is therefore that the noise principally comes from the engine. However, it is so that a relatively large amount of the noise inside the passenger compartment originates from road noise. In modern cars a great deal of effort has been applied to minimize the engine noise which penetrates into the passenger compartment and also road noise but there still remains a lot when it is a question of the latter. Minimizing the noise from the road and the wheels is moreover becoming more important as the engine noise decreases because the noise from the road and wheels in this case, relatively seen, forms a larger part of the total noise in the passenger compartment.

The noise which is usually attributed to the wheels of the vehicle comprises partly the external noise which is produced when a wheel meets the road surface and partly the sound which is produced in the air cavity inside the wheel because of a standing wave being excited which is based on the natural frequency (resonance frequency) of the wheel. Thus there occurs what can be described as a resonance tone inside the wheel. The natural frequency of the wheel is determined by the circumference in such a way that the circumference of the internal air cavity is equal to one wave length. The bigger the wheel, i.e. the bigger the circumference, the longer the wave length and therewith the lower the natural frequency. A 15" wheel has a natural frequency of approximately 230 Hz. The frequency interval which is of interest in this connection is from approximately 250 Hz down to just under 100 Hz, where the latter corresponds to a truck wheel. The external noise which belongs to the meeting of the tire with the road surface depends e.g. on the appearance of the tire, the pattern of the tread and the material of the tire, as well as the road surface. This noise is airborne. The noise which occurs inside the wheel as a result of resonance vibration is to a certain degree airborne but to the greatest part it is a sound body, i.e. the sound propagates via the wheel suspension and further into the passenger compartment of the car.

The object of the present invention is to suppress there so-called natural frequency sounds in wheels which originate in the air cavity inside the wheel.

Devices for suppressing sound inside wheels are known from EP-A-0 663 306 and JP-A-07 052 616. From these documents it is known in the prior art to suppress sound inside wheel cavities by quite simply placing a sound-absorbing material there. The effect of this must be considered to be extremely limited. In EP-A-0 663 306 is mentioned e.g. that the invention is to suppress noise which originates from the natural vibrations in the wheel cavity and, as an example, natural frequencies from 150 to 250 Hz are mentioned. In the last mentioned document it is also shown how resonators can be arranged in connection to the sound absorbers inside the tire. These resonators are, however, intended to absorb sounds other than natural frequency sound, as their design is such that their dimensions limit sound suppression to frequencies of the order of 1000 Hz, which greatly exceed the natural frequency of a vehicle wheel. As mentioned, the natural frequency is determined by the circumference of the wheel. A natural frequency of 1000 Hz would correspond to a wheel with a diameter of approximately 11 cm.

The use of resonators for sound suppression in wheels is in itself also known from EP-B-0 041 127 and EP-A-0 665 529. In the first of these documents the resonator is on a sound shield which is placed on the outside of the wheel. In the second of these documents resonators are placed in the wheel housing. Both these documents therefore show sound suppression of external airborne sound originating from the wheel's contact with the ground. Neither of these documents treat the problem of body-transmitted sound depending on the natural vibrations inside the wheel.

Finally, in order to illustrate the prior art, JP-A-487 803 is mentioned, from which document it is known to half the wave length and thereby double the resonance frequency inside a wheel by producing an intermediate wall inside the wheel. The resulting double frequency is not experienced to be equally noisy as the original frequency. Here, however, it is not a question of sound suppression in a strict sense.

SUMMARY OF THE INVENTION

The problem of suppression of natural frequency is solved according to the present invention by a method and arrangement which includes providing at least one resonator inside the wheel, the resonator being designed for suppression of second resulting from the natural frequency of the wheel.

The advantage of the present invention as it is defined in the independent claims is that a considerably more effective suppression of noise originating from the wheel cavity is obtained than is the case according to the prior art. By using resonators, sound with the frequency which the resonators are tuned to is in principle completely extinguished. Through this sound suppression, the comfort for the driver and the passengers who are in the cabin space of the vehicle is improved. A lower sound level has also the advantage that it leads to improved safety because one quite simply becomes tired from being in a noisy environment.

Consequently, by means of the invention, a sound-suppression device is obtained which is effective and easily can be adapted to different wheel dimensions. The invention has furthermore the advantage that also several frequencies can be suppressed by using several resonators, tuned to different frequencies. In this way, there is the possibility to use the same arrangement for several wheel dimensions without requiring individual adaptation. There is also the possibility of integrating the sound-suppression device in the wheel on or in the tire itself. No loose devices are needed in this case, which signifies a further advantage.

Other features and advantages of the present invention will become apparent from the following description of the invention which refers to the accompanying drawings.

BRIEF DESCRIPTION OF THE DRAWINGS

The invention will now be described in detail with reference to a number of embodiments illustrated in the accompanying drawings, in which.

DETAILED DESCRIPTION OF THE PREFERRED EMBODIMENT(S)

Figure 1A:
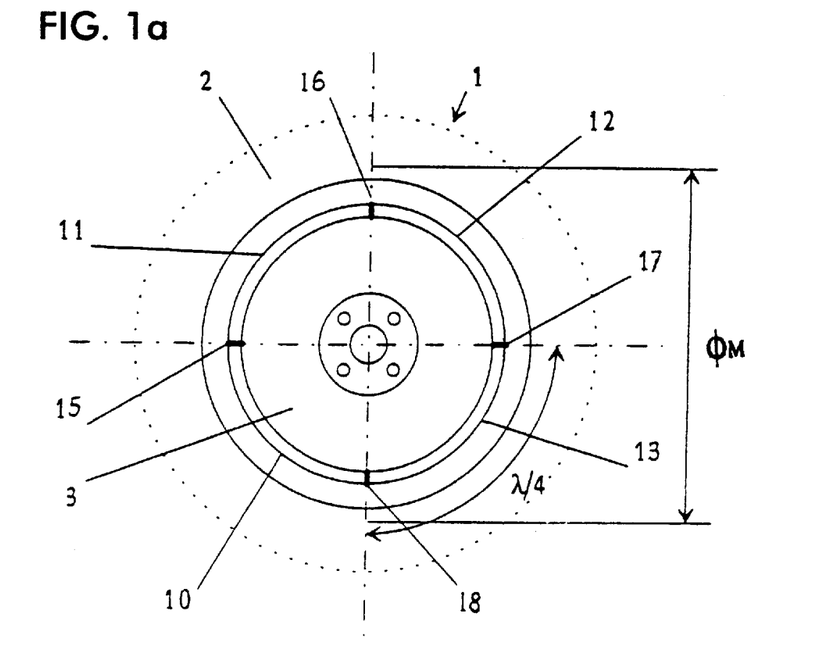
FIG. 1a shows a sketch of the principles of the arrangement according to the invention.

The principle of the invention is shown in FIG. 1*a*. A vehicle wheel 1 comprises a tire 2 and a rim 3. Inside the wheel is a cavity 5 (FIG. 4) filled with air, more precisely between the bottom 7 of the rim 3 and the inside of the tire 2. This cavity extends around the whole of the wheel and has a mean diameter with reference numeral $\emptyset_M$. When the wheel meets the road surface, a standing wave with a resonance frequency which is specific for the wheel and which is determined by the diameter of the wheel will be excited inside this air cavity. As an example it can be mentioned that a 15" wheel has a mean diameter $\emptyset_M$, for the air cavity of approximately 47 cm and a circumference of 148 cm. A sound wave length of $\lambda$=148 cm corresponds to a first resonance in the cavity of $f_r$=230 Hz.

Figure 1B:
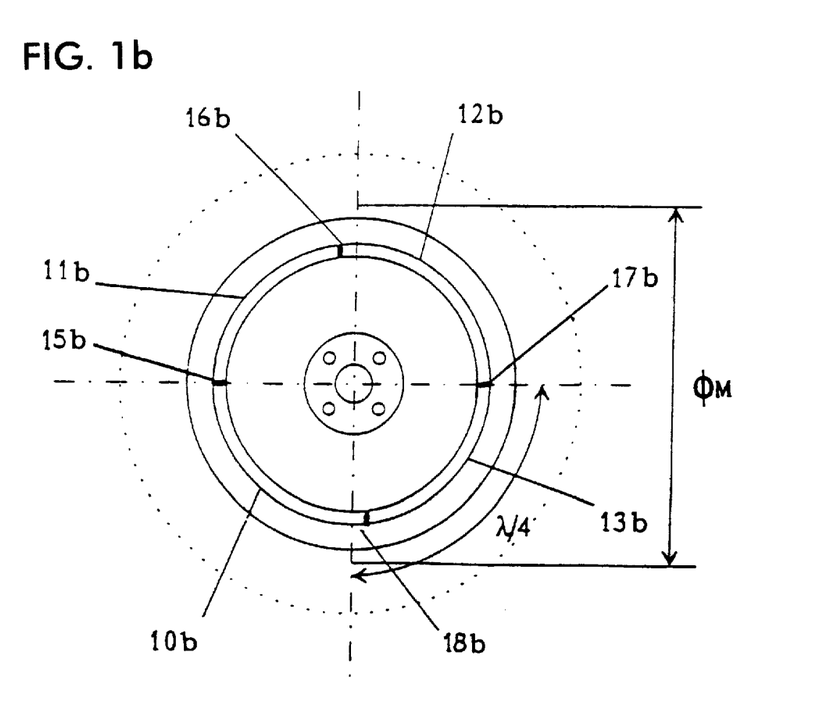
FIG. 1b shows a sketch of the principles where the length of the resonators varies.
Figure 1C:
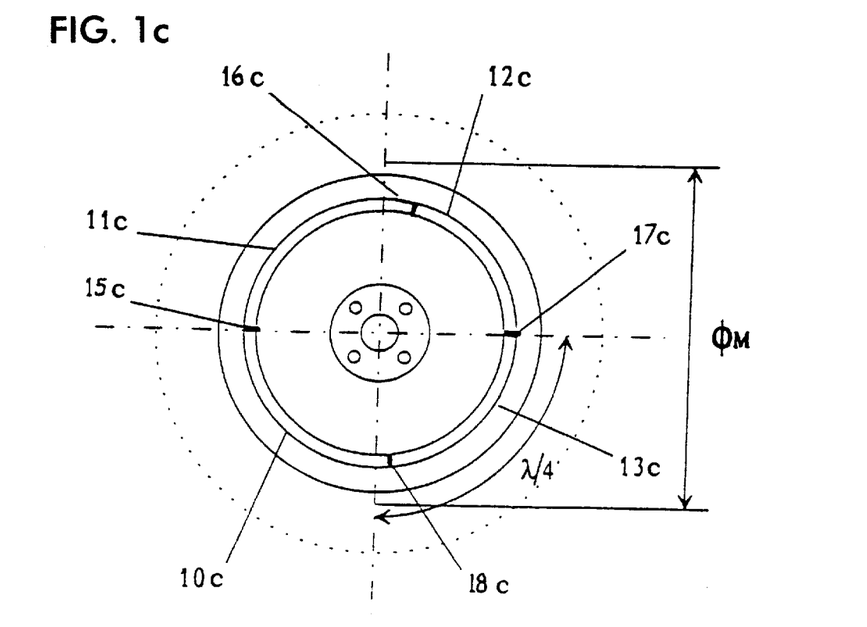
FIG. 1c shows a sketch of the principles where the length of the resonators varies in a different way to that in FIG. 1b.
Figure 1D:
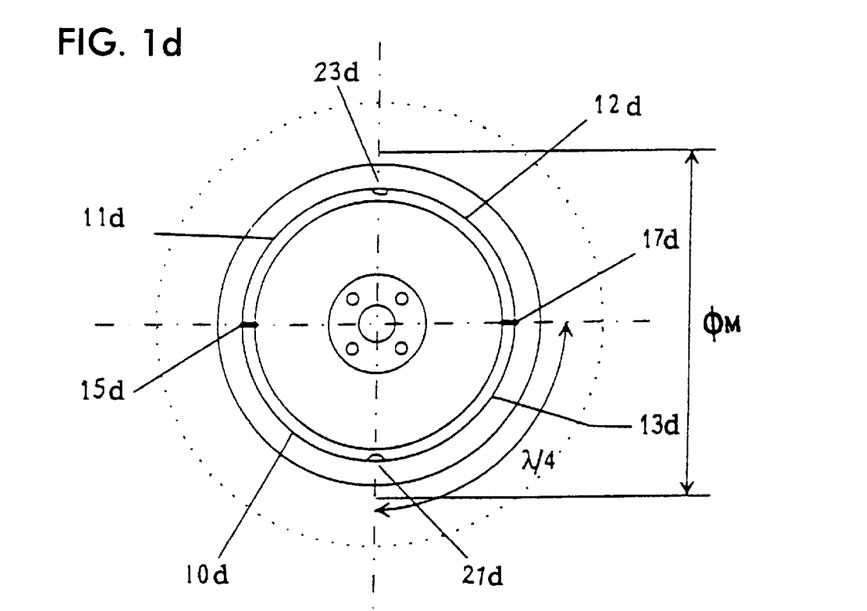
FIG. 1*d* shows a sketch of the principles where the resonators vary in a way different to that of FIG. 1*b*.
Figure 1E:
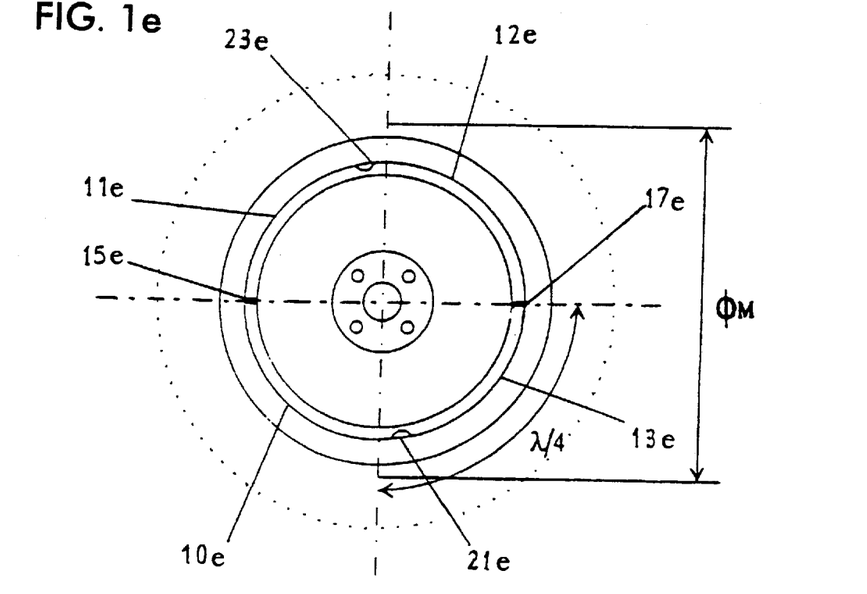
FIG. 1*e* shows a sketch of the principles where the resonators vary in yet another way different to that of FIG. 1*b*.
Figure 1F:
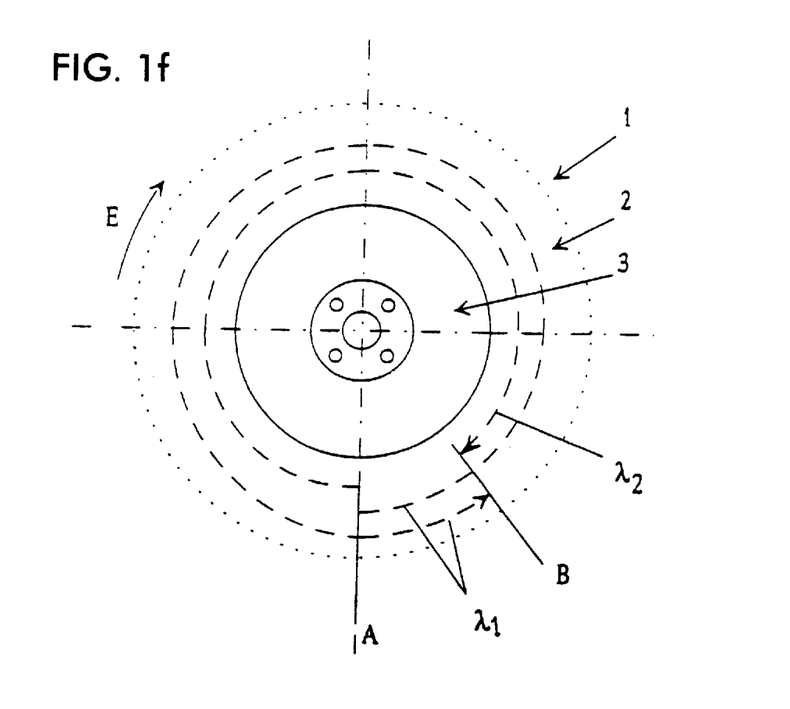
FIG. 1*f* shows a sketch of the principles of how the wave length for the frequency is influenced by the rotation of the wheel.

However, with increasing rotational velocity of the wheel, two oppositely travelling sound waves are produced which consequently have different lengths of path, one being shorter than 148 cm and the other longer than 148 cm. This means that a wheel which rotates has two natural frequencies, one on each side of $f_r$=230 Hz. The principle of this is illustrated in FIG. 1*f*. The letter A denotes the contact point between the wheel and the ground at the time t. If the wheel rotates with the rotational direction which is shown by the arrow E, the contact point between the wheel and the road surface at the time t+1 will be at B. From this follows that the wave length $\lambda_1$ for the resonance tone which is excited in the direction opposite to the rotational direction of the wheel is longer than the wave length $\lambda_2$ for the resonance tone which is excited in the rotational direction of the wheel.

In order to extinguish the resonance sound already inside the wheel, the wheel is provided with a hose which is placed inside the wheel and which is divided by means of intermediate walls into four sections 10,11,12,13, wherein each section corresponds to ¼ wave length. Each hose section is provided with an opening at one end and directed towards the cavity, whereby four so-called quarter-wave resonators are obtained.

A quarter-wave resonator functions so that the reflected sound will be in anti-phase to the incident sound, wherein the sound is quite simply extinguished.

FIG. 1*a* shows the principle case where the four quarter-wave resonators are equally long. In order to also be able to extinguish sound, in accordance with that which has been discussed above for increased rotational speed, originating from two ground resonances, the four quarter-wave resonators can be made pair wise equally long. In FIG. 1*b* a sketch of the principles for this case is shown. From the Figure is evident that two of the resonators 11*b*, 13*b* are made somewhat shorter than a quarter-wave length based on the mean diameter $\emptyset_M$, i.e. in the example described, somewhat shorter than $\emptyset_M$=47/4 cm, and the other two resonators 10*b*, 12*b* are made somewhat longer. It would also be conceivable to let the resonators partially overlap if it is considered necessary to have longer resonators.

It is obviously also conceivable to make the resonators of varying length to be able to extinguish sound within a somewhat larger region around the resonance frequency which is based on the mean diameter $\emptyset_M$ of the wheel, and which thus corresponds to greater variations in the rotational speed of the wheel. One example of such an embodiment is shown in FIG. 1*c*. From the Figure can be seen that the resonator 13*c* is made somewhat shorter than a quarter-wave length based on the mean diameter $\emptyset_M$ of the wheel, i.e. in the described example somewhat shorter than $\emptyset_M$=47/4 cm, that the resonator 12*c* is made even shorter, i.e. is tuned for an even higher frequency, that the resonator 10*c* is made somewhat longer than a quarter-wave length and that the resonator 11*c* is made even longer. i.e. is tuned for an even lower frequency. When the resonators are designed so that each of them is adapted to a special natural frequency, only one or two of them will function at a time, i.e. at a certain rotational speed of the wheel. The others will come into function as the speed of rotation changes. In addition, in this way, to be able to extinguish natural frequency sounds within a large interval or one and the same wheel, it is also possible in this way to use an arrangement with the same set of resonators for wheels with different tire dimensions, e.g. both for 15" tires and 16" tires.

As an alternative to having resonators separated from each other and letting each have its own opening, which is the case in FIGS. 1*a*–1*c*, it is conceivable to leave out the partition wall between two resonators and instead have a single opening situated where the partition wall was earlier situated, whereby this opening replaces the earlier two openings. In this way, two quarter-wave resonators are obtained, one in each direction seen from the opening. This alternative is illustrated in FIGS. 1*d* and 1*e*. The arrangement in FIG. 1*d* corresponds to the arrangement in FIG. 1*a* as to size, frequencies and general function of the resonators, while the device in FIG. 1*e* corresponds to the arrangement in FIG. 1*b*. Naturally, it would also be conceivable to perform the corresponding modifications of the device in FIG. 1*c*, but a separate Figure of this has not been included.

As to the following examples of embodiments, they can, of course, also be modified so that any of all the alternative principles above can be applied.

Figure 2:
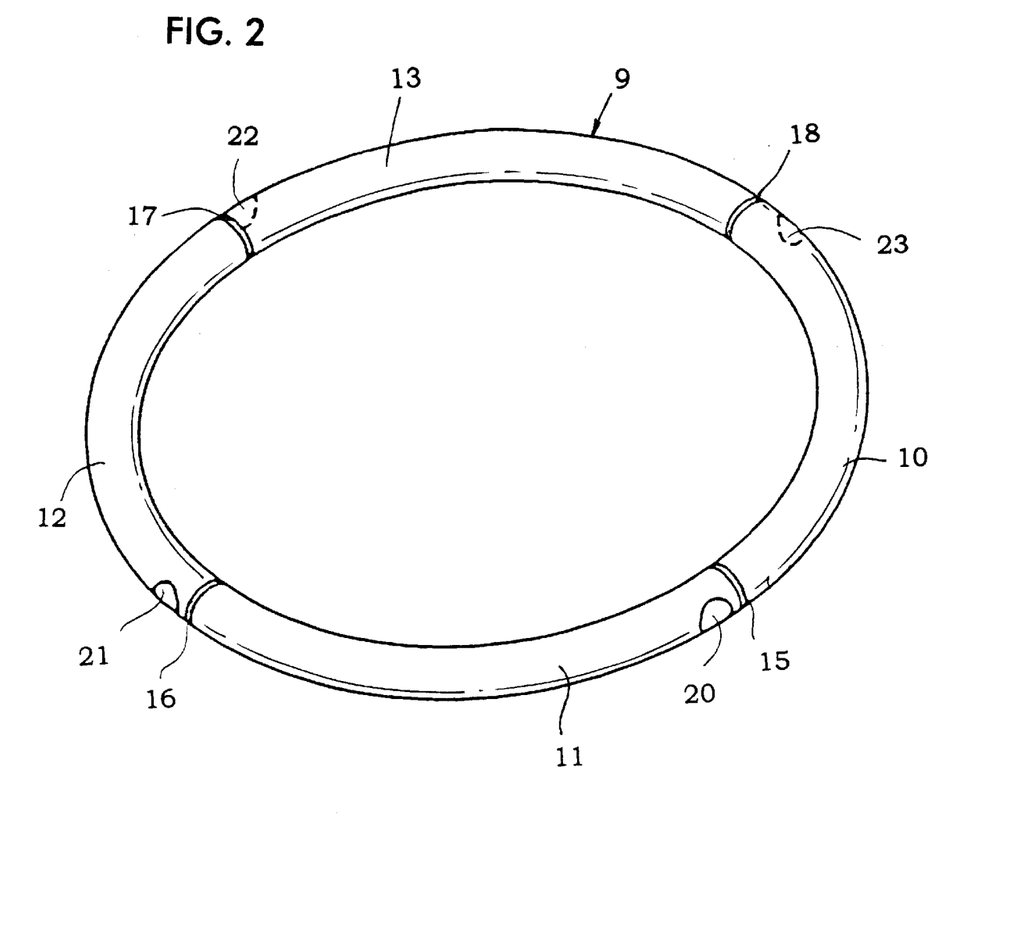
FIG. 2 shows a sketch of the principles of a first embodiment of the device according to the invention.
Figure 3:
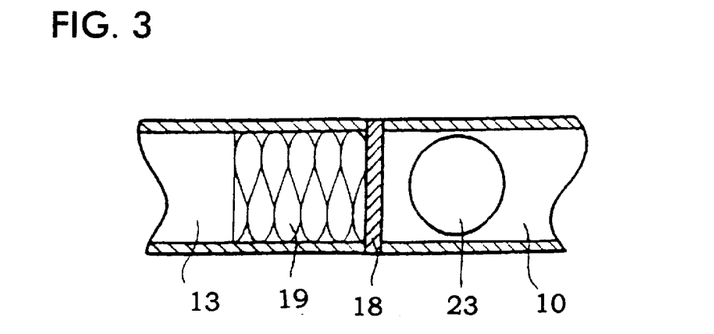
FIG. 3 shows a detail view of the embodiment according to FIG. 2, seen from below and in section.

A first embodiment of the invention is shown in FIG. 2. It comprises a suppression arrangement in the form of a hose 9 divided into four resonators 10,11,12,13. The resonators are separated by intermediate walls 15,16,17,18 arranged inside the hose 9. Each resonator is provided at the one end with an opening 20,21,22,23 facing towards the air cavity inside the wheel. FIG. 3 shows a detail of the arrangement in FIG. 2 in section. Here we can see the resonator 10 with its opening 23 and the resonator 13. Between the resonators 10,13 there is an intermediate wall 18. The end of the resonator 13 abutting the end of the resonator 10 provided with an opening, is preferably at its base provided with an internal damper 19 in the shape of a sound-absorbing material next to the intermediate wall 18. This damper has been arranged in order to cover a somewhat wider frequency interval which, for example, can be desirable because of frequency changes dependent on changes in speed.

The hose is advantageously manufactured from a somewhat flexible material permitting it to be forced onto the rim. Examples of suitable materials are rubber, preferably of a relatively stiff type, plastic or metal.

Figure 4:
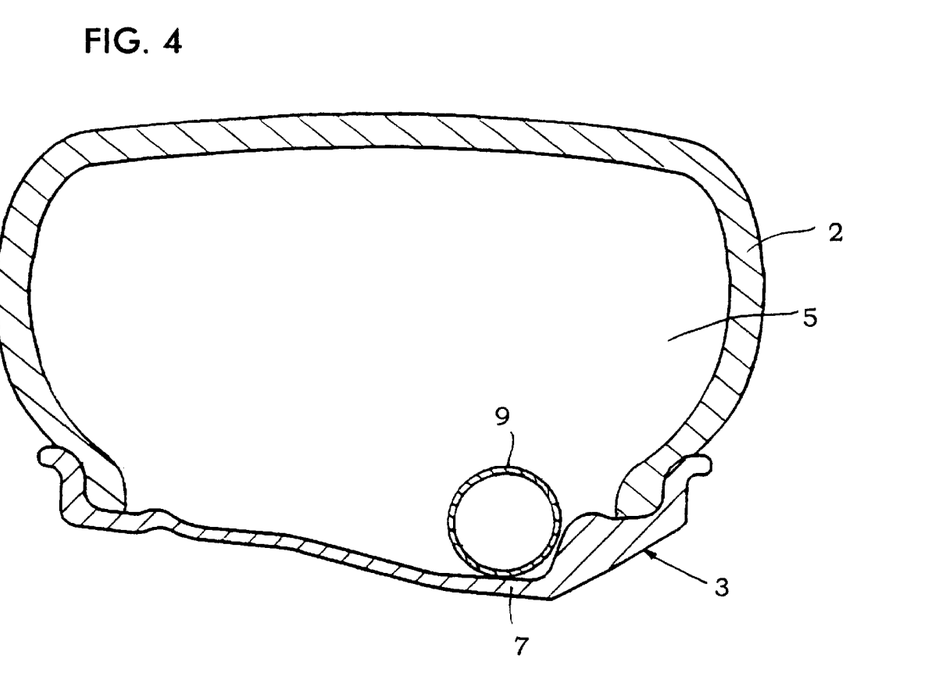
FIG. 4 shows the arrangement in FIG. 2 when it is used in such a way that it is fixed in the bottom of the rim.

The arrangement shown in FIGS. 2 and 3 can advantageously be designed to be fixed in the bottom of the rim of the wheel which is to be dampened. An example of this is shown in FIG. 4. Normally no special design of the rim is required, but the hose is fixed by e.g. gluing or a similar way. It can also be sufficient to optimize the hose for forcing on so that after it has been forced into place, it is fixed. If necessary, however, the bottom of the rim 7 can have a special design to facilitate the fixing of the hose 9.

Figure 5:
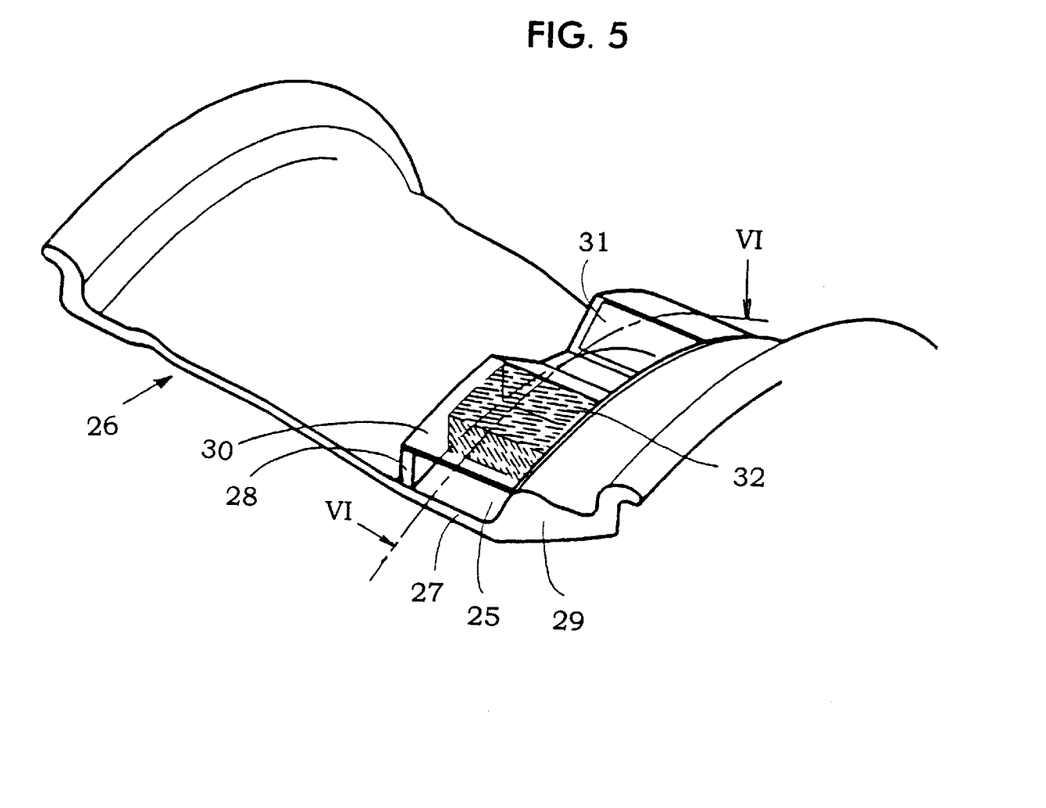
FIG. 5 shows a perspective view of a second embodiment of the device according to the invention.
Figure 6:
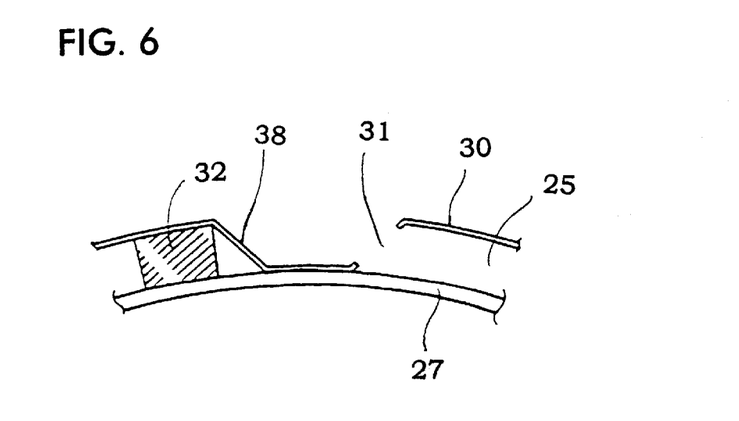
FIG. 6 shows a detail view of the arrangement in FIG. 5, in section seen along the line VI—VI.

FIGS. 5 and 6 show a second embodiment of the arrangement according to the invention. The hose has here been exchanged for a channel 25 which is arranged on the rim 26, more closely defined, on the bottom 27 of the rim. This channel extends around substantially the whole of the circumference of the bottom of the rim. The channel can either be completely integrated into the rim or, as shown in FIGS. 5 and 6, consist of a wall 28 arranged on the bottom 27 of the rim, wherein the space between the edge 29 of the rim and this wall is closed by means of a lid 30 in order to form the channel 25. This lid may possibly need to be provided with some type of damper. The channel 25 is, in the same way as in the first embodiment and in accordance with the sketch in FIG. 1a, divided into four resonators, each provided with an opening at one end, of which only one resonator opening 31 is actually shown. In the other end, i.e. the bottom of the resonator, the channel is closed by an end wall 38 and is preferably provided with a porous absorbent 32 with the sane purpose as before.

Figure 7:
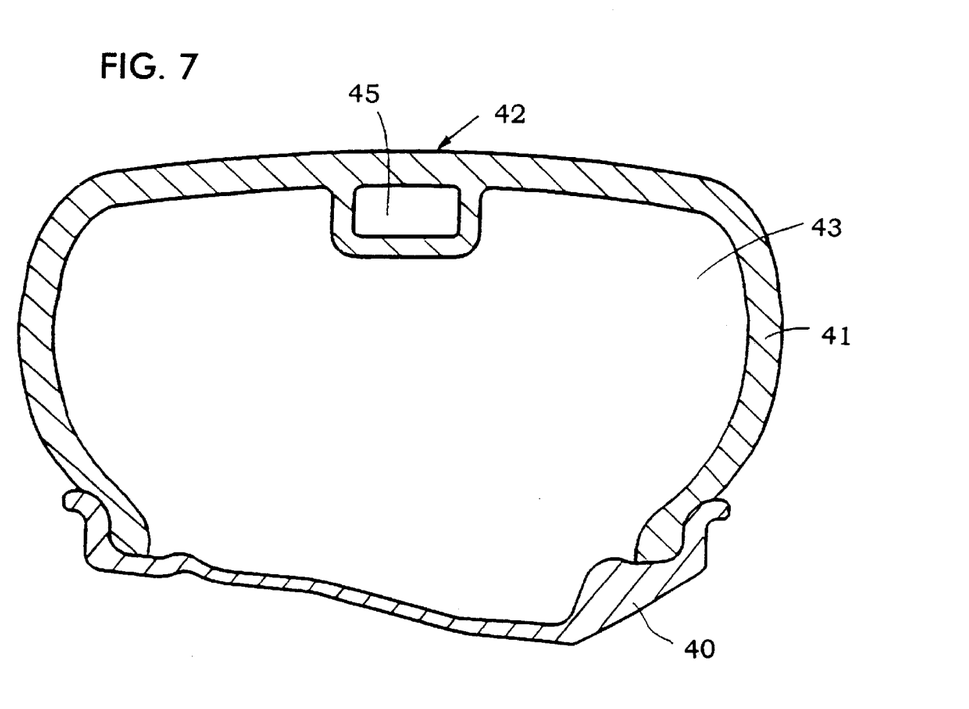
FIG. 7 shows a third embodiment of the arrangement according to the invention seen in section.

FIG. 7 shows a third embodiment of the arrangement according to the present invention. Here we can see a rim 40 on which a tire 41 is mounted. On the inside of the tire 41, i.e. the side which is opposite to the tread 42 and which is facing in towards the cavity 43 which is formed between the rim and the tire, there is a channel 45. This channel corresponds to the channel 25 in the second embodiment and the hose 9 in the first embodiment and extends consequently around essentially the whole of the internal circumference of the tire. The channel 45 is consequently divided into four resonators which are designed in the same way as the quarter-wave resonators in the channel 25 and in the hose 9. The holes of the resonators face in towards the cavity. The channel can be vulcanized fast onto the inside of the tire or already during manufacturing of the tire be integrated into the inside of the tire. Naturally. the channel can also be placed somewhere else on the inside of the tire than opposite the tread (as in the illustrated embodiment), depending on what is appropriate from case to case.

Figure 8:
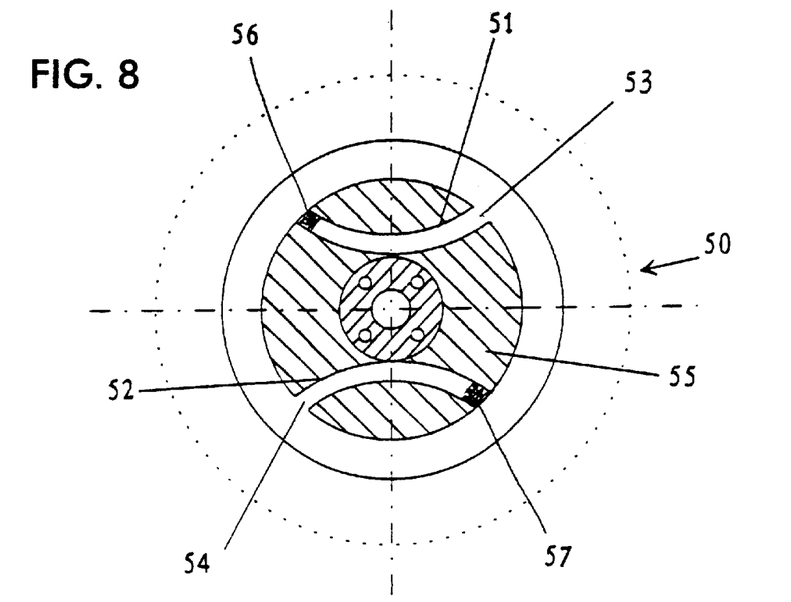
FIG. 8 shows a sketch of the principles of a fourth embodiment of the arrangement according to the invention.

In FIG. 8 a fourth embodiment of the invention is shown. The Figure shows a vehicle wheel 50 in section and here two channels forming quarter-wave resonators 51, 52 are arranged on the inside of the rim wall 55. The resonators are preferably integrated into the rim. They are designed in the same way as earlier quarter-wave resonators, i.e. with an opening 53 and 54, respectively, at one end and preferably with an internal damper 56, 57 in the shape of a porous absorbent in the bottom, i.e. the other end. In this embodiment it could also be possible, instead of forming the resonators as quarter-wave resonators, to form them as Helmholtz-resonators in analogy with FIG. 9 below.

Figure 9:
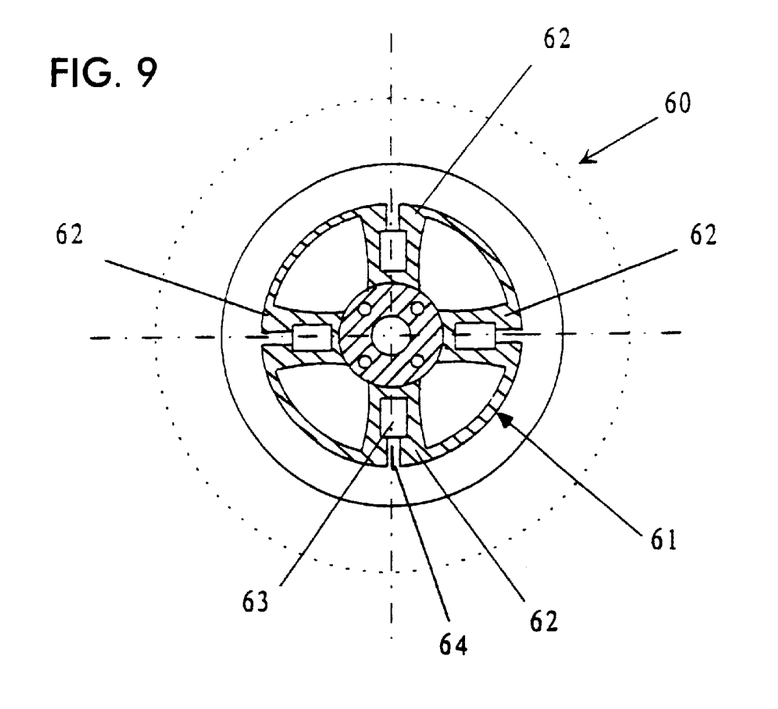
FIG. 9 shows a sketch of the principles of a fifth embodiment of the arrangement according to the invention.

Finally, a fifth embodiment is shown in FIG. 9. According to this embodiment, quarter-wave resonators as well as Helrnholtz-resonators can equally be used. The Figure shows a vehicle wheel 60 in section. The rim 61 is provided with spokes 62. Inside at least one, and preferably more, of the spokes, there are cavities 63 with openings 64 arranged according to the principle for a quarter-wave resonator or a Heimholtz-resonator with volumes tuned for the resonance frequency(ies) which the actual wheel dimension gives rise to. The Figure shows four cavities shaped as Helmholtz-resonators. Also here the resonators are advantageously integrated in the rim.

The above description of different embodiments of sound-suppression arrangements according to the invention are only to be considered to be examples of the invention, and the inventive concept is not to be limited to this but the invention can be varied within the scope of the following patent claims. It must be especially emphasized that in all the embodiments each resonator can be shaped and dimensioned individually so that each separate resonator is tuned for the damping of a specific frequency; alternatively the resonators can be dimensioned pair wise the same. It is also conceivable to modify all the embodiments so that also Helmholtz-resonators can be used. Furthermore, the invention is not be considered limited to motor vehicles but can also be applied to wheels for other types of vehicles, where corresponding problems occur.

What is claimed is:

1. Method for the suppression in wheels of natural frequency noise originating from an air cavity inside the wheel, comprising arranging at least one quarter-wave resonator inside the wheel, the resonator being designed to communicate with said air cavity for suppression of sound resulting from the natural frequency of the wheel.

2. Method according to claim 1, wherein the resonator is integrated into the wheel.

3. Method according to claim 1, wherein the wheel comprises a rim and the resonator is arranged in the rim.

4. Method according to claim 1, wherein the wheel comprises a tire and the resonator is arranged in the tire.

5. Device for suppression in wheels of natural frequency sound originating from an air cavity inside the wheel, which comprises at least one quarter-wave resonator arranged inside the wheel, the resonator being designed to communicate with said air cavity for the suppression of sound resulting from the natural frequency of the wheel.

6. Device according to claim 5, wherein the wheel comprises a tire and a rim, and the resonator comprises a channel-shaped device which is arranged inside the wheel in a cavity which is formed between the tire and a rim of the wheel.

7. Device according to claim 6, wherein the channel-shaped arrangement has a total length corresponding to a wavelength of the natural frequency sound of the wheel, and includes partition walls arranged inside the channel for dividing the channel into four channel sections, each being provided with an opening facing towards the wheel cavity and each forming a quarter-wave resonator for suppression of the natural frequency sound of the wheel.

8. Device according to claim 7, wherein each of the channel sections is essentially of equal length.

9. Device according to claim 7, wherein the four channel sections are arranged in pairs, the two sections in each pair being essentially equally long and each pair being dimensioned for suppression of natural frequency sound of the wheel of one of essentially two frequencies resulting from two sound-waves traveling in opposite directions which occur when the wheel rotates against a surface.

10. Device according to claim 7, wherein the four channel sections have different lengths for suppression of natural frequency of sound of essentially four different frequencies of the wheel resulting from two sound waves traveling in opposite directions and at two different rotational speeds which occur when the wheel rotates against a surface.

11. Device according to claim 6, wherein the channel-shaped arrangement has a total length corresponding to one wavelength of the natural frequency sound of the wheel and includes partition walls arranged inside the channel for dividing the channel into two channel sections each being provided with an opening facing towards the wheel cavity, and each forming two quarter-wave resonators for the suppression of the natural frequency sound of the wheel.

12. Device according to claim 11, wherein the openings of the respective channel sections arc arranged substantially in the middle of the channel sections so that each channel section forms two quarter-wave resonators, one in each direction, as seen from the opening, wherein the channel-shaped arrangement is divided into four essentially equally long quarter-wave resonators for the suppression of the natural frequency sound of essentially one frequency.

13. Device according to claim 11, wherein the openings of the respective channel sections are arranged substantially near the middle of the channel section so that each channel section forms two quarter-wave resonators, one in each direction, as seen from the opening, and are arranged in pairs which are essentially equally long and are dimensioned for the suppression of the natural frequency sound of essentially two frequencies of the wheel resulting from two sound-waves traveling in opposite directions which occur when the wheel rotates against a surface.

14. Device according to claim 11, wherein the openings of the respective channel sections are arranged near the middle of the channel section so that each channel section forms two quarter-wave resonators, one in each direction, as seen from the opening, whereby the two quarter-wave resonators are somewhat different in length and are dimensioned for the suppression of the natural frequency sound of essentially four different frequencies of the wheel resulting from two sound-waves traveling in opposite directions and at two different rotational speeds which occur when the wheel rotates against a surface.

15. Device according to claim 6, wherein the channel-formed arrangement is a hose.

16. Device according to claim 11, wherein the hose is fixed in a bottom of the rim and has at least one opening facing towards the wheel cavity.

17. Device according to claim 6, wherein the wheel has a tread surface and an opposing inner side and the channel-shaped arrangement is a channel arranged on the opposed inner side of the tread surface and extending around essentially the internal circumference of the whole of said opposed inner side.

18. Device according to claim 6, wherein the channel is integrated in the tire.

19. Device according to claim 6, wherein the channel-shaped arrangement is a channel in a bottom of the rim and extends around essentially the whole of the circumference of the bottom of the rim.

20. Device according to claim 19, wherein the channel comprises at least one wall extending from the bottom of the rim and a cover which covers the space which is formed between said wall and a side of the rim.

21. Device according to claim 20, wherein the rim has spokes and at least one of the spokes has a cavity forming a resonator with an opening facing towards the wheel cavity.

22. Device according to claim 6, wherein the resonator is integrated in the rim.

23. Device according to claim 5, wherein the wheel comprises a tire and a rim, wherein the rim has two external sides facing away from the tire and a rim with two internal sides facing towards the tire, and the rim in at least one of its internal sides is provided with at least one cavity shaped as a resonator with an opening facing towards the wheel cavity.

* * * * *